Feb. 7, 1933.  S. ELLIS  1,896,229
METAL FLOWERPOT
Filed Jan. 16, 1931
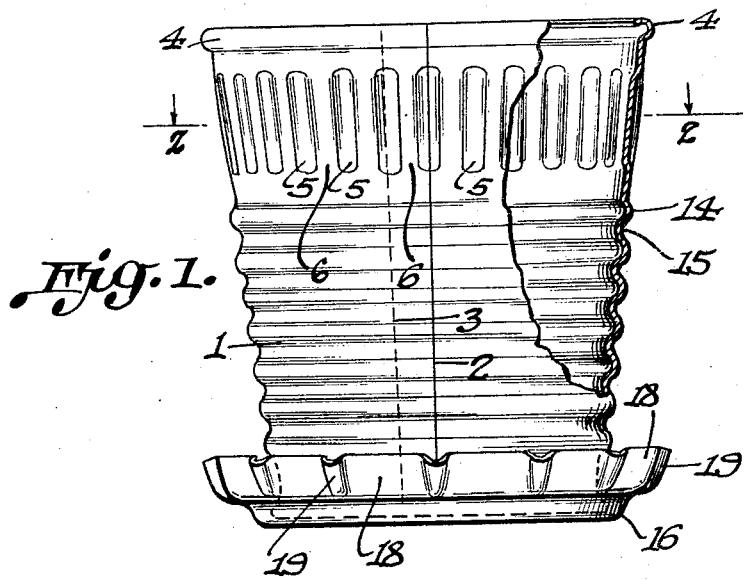
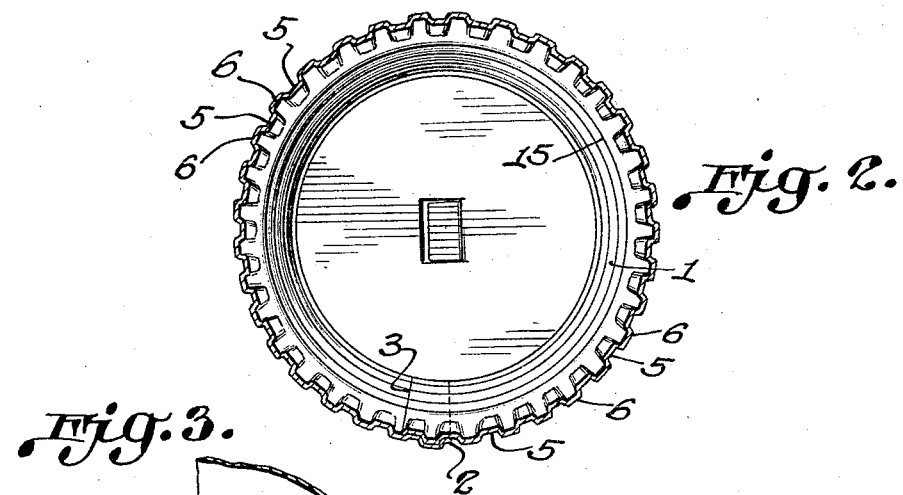
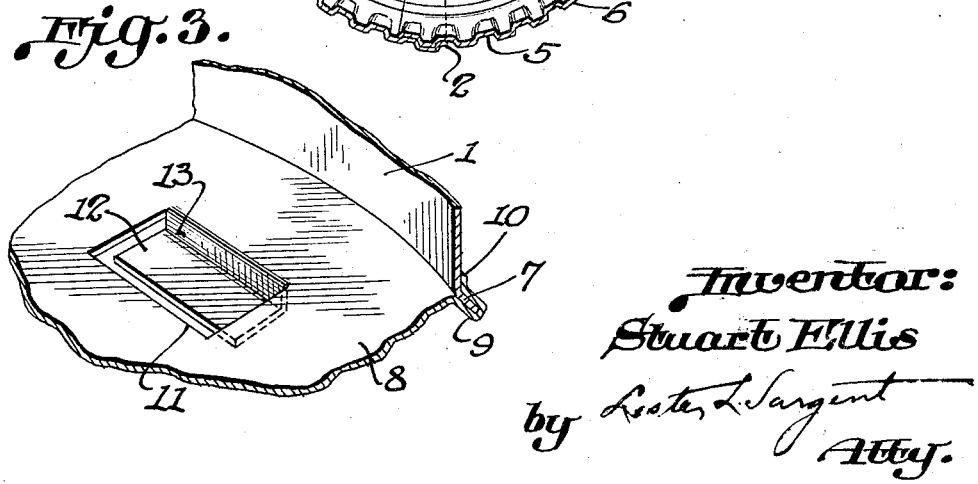

Patented Feb. 7, 1933

1,896,229

UNITED STATES PATENT OFFICE

STUART ELLIS, OF FREDERICKSBURG, VIRGINIA

METAL FLOWERPOT

Application filed January 16, 1931. Serial No. 509,216.

The object of my invention is to provide a novel and ornamental metal flower pot of adequate strength, and so constructed as to permit of its being manufactured at a low cost; and to provide a novel tray for said flower pot reinforced in a novel and ornamental manner, and to provide means for the absorption of water from the tray to the earth in the bottom of the flower pot.

I attain these and other objects of my invention by the device illustrated in the accompanying drawing, in which,—

Figure 1 is a side elevation of my invention with a portion of the flower pot broken away and shown in section;

Fig. 2 is a sectional view of the invention, on line 2—2 of Fig. 1;

Fig. 3 is a detail perspective view of the bottom of the flower pot, a portion of which is broken away to show details of construction;

Like numerals designate like parts in each of the three views.

Referring to the accompanying drawing, I provide a metal flower pot the body of which is formed by the metal strip 1 of segmental shape and having the ends 2 and 3 overlapped as shown in Figs. 1 and 2 to form a frustocone, inverted. The overlapped portions are spot welded. This construction greatly facilitates manufacture of the flower pot since accurate positioning of the edges is not necessary and no projecting seam is formed to mar the appearance or to complicate the operation of fastening the body of the pot as shown. I provide an annular reinforcing crimp 4 at the top of the flower pot, this crimp being semicircular in cross section and bowed outwardly, this construction having been found to give the greatest strength and to add to the ornamental character of the flower pot. I also provide a series of spaced vertical indentations or crevices 5 with unindented portions 6 of the wall 1 of the flower pot intervening. Besides adding to the ornamental appearance of the flower pot these indentations or corrugations greatly increase its strength. Spaced slightly below the corrugations or indentations 5, I provide the annular corrugations 14 and 15 encircling the flower pot and also serving both to increase the ornamental appearance of the article and to reinforce it.

The bottom 8 of the flower pot is crimped at 9, as shown in Fig. 3, to extend over the slightly outturned annular flange 7 of the wall 1 of the flower pot. The crimp 9 terminates in an end portion 10 which lies against the outside wall 1, as shown in Fig. 3. The base 8 of the flower pot has a cut out portion 11, a strip 13 of the base being bent downwardly and the portion 12 then bent horizontally parallel with the bottom of the pot but spaced slightly below it, thereby leaving an L-shaped aperture through which water may seep when the plant is watered more than necessary, and through which it may in turn be absorbed by capillary attraction to water the plant from a surplus of water in the tray.

What I claim is:

1. A metal flower pot having an annular corrugation at the top thereof, said corrugation being outwardly bowed in cross section, a series of spaced vertical corrugations extending around the pot in proximity to the upper edge of the pot, whereby to stiffen the material and to improve its attractive appearance.

2. A metal flower pot of the type described, having a corrugated reinforced body portion, a base affixed to the body portion, the base having a cut out strip in the bottom thereof said cut out strip being bent into approximately L-shape with the bottom portion thereof substantially parallel with but spaced below the base to provide a narrow aperture through which water may seep or be drawn upward into the pot by capillary attraction of the earth within the pot.

3. In a device of the type described, the combination of a metal flower pot having side walls thereof reinforced by vertical and annular corrugations, the base of the pot having a strip cut and bent into L-shape to provide a narrow aperture for the seepage of water therethrough.

STUART ELLIS.